(12) United States Patent
Ioannou et al.

(10) Patent No.: US 6,771,840 B1
(45) Date of Patent: Aug. 3, 2004

(54) APPARATUS AND METHOD FOR IDENTIFYING THE POINTS THAT LIE ON A SURFACE OF INTEREST

(75) Inventors: Dimitrios Ioannou, Fremont, CA (US); Mark Damon Wheeler, Oakland, CA (US)

(73) Assignee: Leica Geosystems HDS, Inc., Oakland, CA (US)

( * ) Notice: Subject to any disclaimer, the term of this patent is extended or adjusted under 35 U.S.C. 154(b) by 0 days.

(21) Appl. No.: 09/574,671

(22) Filed: May 18, 2000

(51) Int. Cl.$^7$ ............................................. G06K 9/36
(52) U.S. Cl. ..................... 382/285; 382/154; 345/121
(58) Field of Search ............................ 382/285, 284, 382/286, 287, 289, 291, 294, 295, 282, 154, 276, 321, 319; 356/147, 141.1, 5.01, 141.3, 141.5, 603; 385/88; 345/423, 419, 421; 348/578

(56) References Cited

U.S. PATENT DOCUMENTS

| | | | | |
|---|---|---|---|---|
| 5,198,877 A | * | 3/1993 | Schulz ..................... 356/614 |
| 5,259,037 A | * | 11/1993 | Plunk ........................ 382/154 |
| 5,557,397 A | * | 9/1996 | Hyde et al. ................. 356/5.01 |
| 5,600,436 A | * | 2/1997 | Gudat ..................... 356/141.3 |
| 5,850,289 A | * | 12/1998 | Fowler et al. .............. 356/603 |
| 5,886,702 A | * | 3/1999 | Migdal et al. .............. 345/423 |
| 5,912,739 A | * | 6/1999 | Fowler et al. .............. 356/613 |
| 6,023,326 A | * | 2/2000 | Katayama et al. ........ 356/141.3 |
| 6,048,105 A | * | 4/2000 | Ohtomo et al. .............. 385/88 |
| 6,052,181 A | | 4/2000 | Maynard et al. ............ 356/147 |

OTHER PUBLICATIONS

K.L. Boyer et al., "The Robust Sequential Estimator: A General Approach and its Application to Surface Organization in Range Data," *IEEE Transactions on Pattern Analysis and Machine Intelligence*, vol. 16, No. 10, Oct. 1994, pp. 987–1001.

A.B. Dobrzeniecki et al., "Interactive and Intuitive Segmentation of Volumetric Data: The Segmentview System and the Kooshball Algorithm," *IEEE Comp. Soc. Press, US*, vol. 3, Oct. 23, 1995, pp. 540–543.

*A Technical Leap In Robotic Programming May Be On The Horizon;* by Andrew Cullison; Welding Journal, Jul. 1998; pp. 49–52.

*Rapid Laser Scanner Heralds New Advance In Terrestrial Survey;* Engineering Surveying Showcase; Apr. '99, p. 16.

*Product Bulletin;* Cyra Technologies, Inc. May 18, 1999, 6 pages.

(List continued on next page.)

Primary Examiner—Bhavesh M. Mehta
Assistant Examiner—Seyed Azarian
(74) Attorney, Agent, or Firm—Stallman & Pollock LLP

(57) ABSTRACT

An apparatus and method are described that allow a surface of interest to be defined by the selection of a seed point that lies on the surface of interest. When a single seed point is defined, additional points that are in the vicinity of the seed point are grouped with the seed point to form a first set of points. When multiple seed points are defined, additional points that are in the vicinities of the seed points are grouped with the seed points to form the first set of points. The first set of points, along with a surface type, are then used to define a candidate surface. Following this, a second set of points is defined using the seed points and additional points that fall within a predefined distance of the candidate surface. The second set of points are partitioned into groups, and the groups that include the seed points along with the surface type are then used to redefine the candidate surface.

36 Claims, 3 Drawing Sheets

OTHER PUBLICATIONS

*New Equipment, Supplies and Sevices;* Cyra Technologies Inc. Point Of Beginning (POB) Magazine; Dec. 1998, p. 66.
*Products, People, Places; 3D Laser Mapping System;* Professional Surveyor Magazine; Nov./Dec. 1998, p. 62.
*Products, 3–D Laser Mapping System;* New Equipment Digest; Nov. 1998, p. 76.
*Front Page, Laser & Optronics; Laser Profiling Package;* Oct. 1998, p. 1.
*Literature & Products, Imaging System;* Power Engineering Magazine, Oct. 1998, p. 72.
*Showcase, 3–D Laser Mapping;* GPS World Magazine, Dec. 1998 Issue, vol. 9; p. 48.
*HP Innovations, Mapping System Lowers As–Built Survey Costs;* Hydrocarbon Processing Magazine; Oct. 1998, p. 35.
*A/E/C '98; Expanding Horizons, Bold Initiatives, An Overview of A/E/C Systems '98;* Microstation Manager, Aug. 1998; pp. 40–43.
*Cyrax 3D Laser Scanner: Computer Aided Construction;* Cyra 3D Digital Reality; May 21, 1999, One page.
*Cyrax Laser Scanning: Fabrication; Parts Mating Analysis;* Cyra 3D Digital Reality; May 21, 1999, One page.
*Cyrax 3D Laser Scanner: High Accuracy, Long Range, Data Capture;* Cyrax System Overview; Cyra 3D Digital Reality, May 21, 1999, pp. 1–3.
Cyrax 2400 Mark 1 3D Laser Scanner; Cyrax 2400, Cyra 3D Digital Reality, May 21, 1999, pp. 1–2.
*Cyrax: Long range 3D Laser Scanner; Cyrax 2400 Specs.;* Cyra 3D Digital Reality, May 21, 1999, pp. 1–3.
Cyrax 3D Software: Automatic 2D Extraction; Cyra 3D Digital Reality, One page.
New 3D Scanner Zaps Sci–Fi Movie Set; Professional Surveyor, New Technology, Apr. 1999, pp. 5 pages.
U.S. patent application Ser. No. 60/143,695, filed Jul. 14, 1999.
U.S. patent application Ser. No. 09/177,913, filed Oct. 23, 1998, This application has been allowed and the issue fee paid on Mar. 17, 2000.

* cited by examiner

APPARATUS AND METHOD FOR IDENTIFYING THE POINTS THAT LIE ON A SURFACE OF INTEREST

BACKGROUND OF THE INVENTION

1. Field of the Invention

The present invention relates to an apparatus and method for identifying the points that lie on a surface of interest and, more particularly, to an apparatus and method for identifying the points that lie on a surface of interest that requires minimal user input. The invention may be used to produce a group of points that lie on the surface of interest, and may also be used to create a representation of the surface of interest from the previously identified group using surface fitting techniques.

2. Description of the Related Art

It is often desirable to have computer models of large physical structures, such as a petroleum refinery. Computer models facilitate an understanding of the structure that is beneficial in a number of ways.

One technique for constructing these computer models begins by laser scanning the structure. In the laser scanning process, a laser beam scans across a view that encompasses the structure of interest. The scanning device measures a plurality of points that lie on the surfaces that are visible in the scene, and typically there is some measurement error associated with the points. Each scan point has a measured location in 3D space, usually in terms of an (x,y,z) point in the scanner's local coordinate system.

The laser scanning process measures the 3D data of a large number of points. The resulting collection of points is often referred to as one or more point clouds. The point clouds typically have points that lie on many different surfaces, depending on the scene that was scanned. For example, a scan taken at a petroleum refinery may include a point cloud that has points on pipes, elbows, valves, pumps, and structural steel members.

Once the 3D data for the points in the scan have been collected, the 3D data of the points are often processed to generate a computer model of the structure, although in some cases the points themselves may be the desired final product of the scanning process. One technique for processing the 3D point data is to first group together the points that lie on the same surface. After the points are grouped together, the points are processed with a prior-art fit procedure that defines a surface consistent with the points. For example, the points that lie on the surface of a cylindrical storage tank can be grouped together, and then processed by a prior-art fit procedure to construct a geometric model of the surface of the cylindrical tank.

One technique for grouping together the points that lie on the same surface, known as manual segmentation or point cloud partitioning, is to manually partition the points that appear to lie on the surface of interest into a group. For example, a user can select one or more groups of points and then draw a polygonal fence around the points that appear to lie on the surface of interest, such as the surface of the cylindrical storage tank, while excluding points that lie on other surfaces. The manually specified polygonal fence is used to cut the specified collection of points into two groups: a group inside the fence that represents those points on the surface of interest, and a group of points outside the fence that represent data on other surfaces.

Once a group of points has been defined, the grouping process may need to be repeated to remove spurious points that do not lie on the desired surface. The view presented to the user, which is formed from thousands of points, is a 2D projection of 3D space. As a result, two close-together points that appear to be on the same surface in a 2D view may actually be on different surfaces, one surface lying in the foreground of 3D space with the other surface lying in the background.

Thus, once a group of points has been defined, the user looks at the same scene from a view that is, for example, perpendicular to the first view. If points exist that are not part of the desired surface the user then again manually partitions the points that appear to lie on the surface of interest. This second partitioning removes points that appeared to be correct in the first view, but in fact were positioned at a depth other then the depth associated with the object of interest. The user typically can isolate points on the desired surface in one or two manual segmentation steps, but in some cases additional segmentation may be needed.

Following the manual segmentation, a fit procedure is utilized to generate a geometric primitive of the surface of interest from the surface points. Once the primitive has been generated, fit statistics are reviewed. Frequently, the fit statistics fall below acceptable levels due to the inadvertent inclusion of spurious points—points which were included in the manual selection steps but which are not on the surface of interest.

When this occurs, the user must perform additional manual segmentation steps to remove spurious points that are not really on the desired surface. The inclusion of spurious points is a common problem as it is difficult to identify the points that lie on the surface of interest when viewing them on a computer screen in 2D.

As a result, the procedure for generating a computer model of a surface from 3D point data is a time consuming and error prone process. Thus, there is a need for a method for identifying the points that define a surface of interest that eliminates the need for the user to manually partition the points that lie on the surface of interest.

SUMMARY OF THE INVENTION

The present invention provides an apparatus and method for identifying the points that lie on a surface of interest that eliminates the need for the user to manually partition the points that lie on the surface of interest. The apparatus of the present invention includes means for selecting a number of seed points that lie on the surface of interest. The number of seed points selected can be one or more than one.

The apparatus of the present invention also includes means for defining a first set of points. The first set of points includes the number of seed points. The apparatus further includes means for adding a number of points to the first set of points. The added points are in vicinities of the number of seed points and likely to lie on the same surfaces as the number of seed points. In one embodiment of the present invention, the apparatus considers some neighboring points, and identifies points to be added on the basis of a uniformity of spacing, using a predetermined spacing factor.

The apparatus of the present invention also includes means for defining a surface type, and means for defining a candidate surface with the first set of points and the surface type. The apparatus further includes means for defining a second set of points, and means for adding points to the second set of points that are within a predetermined distance of the candidate surface. The apparatus additionally includes means for partitioning the second set of points into groups of points, and means for redefining the candidate surface with the groups of points that include the number of seed points, and the surface type.

The method of the present invention begins with the step of selecting a number of seed points. Following this, a first set of points are defined. The first set of points includes the number of seed points. Next, a number of points are added to the first set of points. The added points are in vicinities of the number of seed points, and likely to be on the same surfaces.

Next, a surface type is defined, and then a candidate surface is defined with the first set of points and the surface type. After the candidate surface has been defined, a second set of points is defined. The second set of points includes the number of seed points. Next, a number of points are added to the second set of points that are within the first predetermined distance of the candidate surface. Following this, the second set of points is partitioned into groups of points. Next, the candidate surface is redefined with the groups of points that include the number of seed points, and the surface type.

A better understanding of the features and advantages of the present invention will be obtained by reference to the following detailed description and accompanying drawings that set forth an illustrative embodiment in which the principles of the invention are utilized.

DETAILED DESCRIPTION

Figure 1:
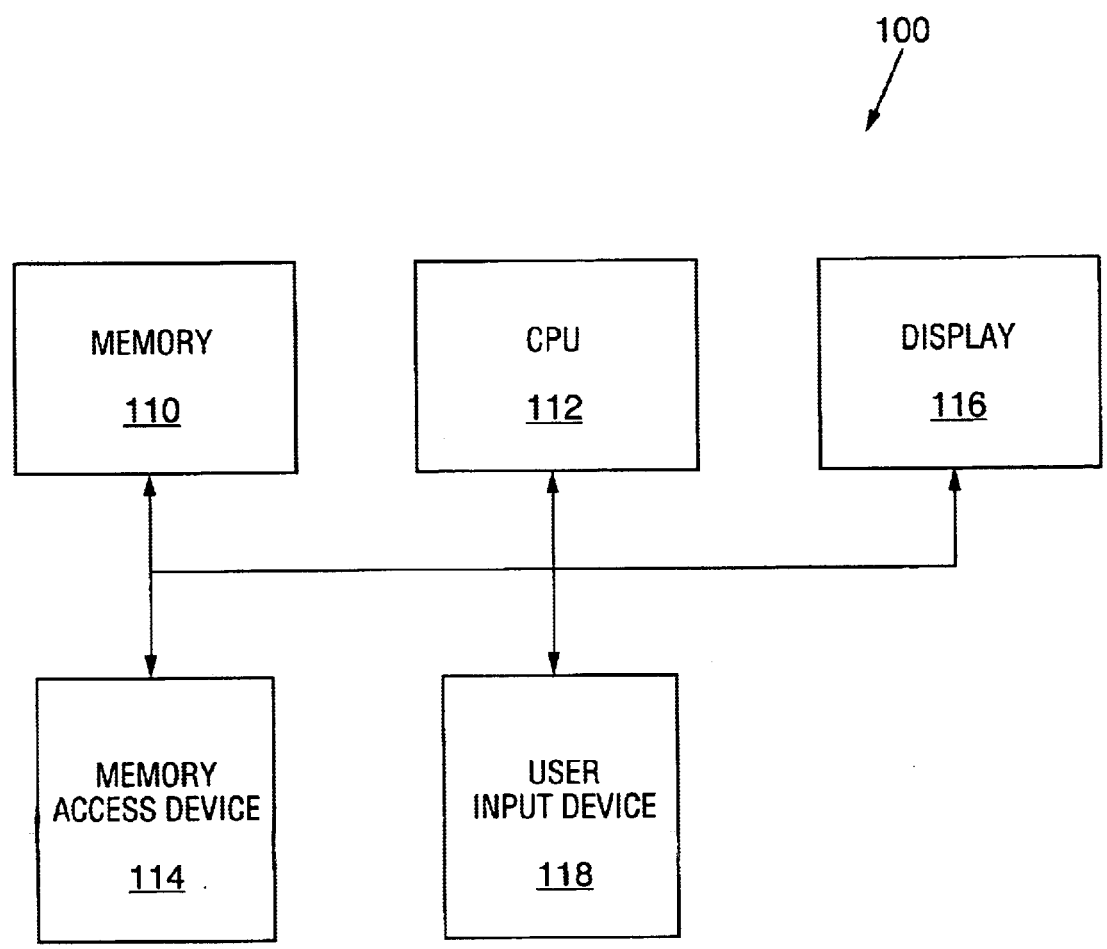
FIG. 1 is a block diagram illustrating a computer 100 in accordance with the present invention.

The present invention is directed to a method for identifying the points that lie on a surface of interest. The method is implemented in software that is programmed into a computer system. FIG. 1 shows a block diagram that illustrates a computer 100 in accordance with the present invention. Computer 100 is programmed with the method of the present invention.

As shown in FIG. 1, computer 100 includes a memory 110 that stores program instructions, 3D point data, and geometric data. The 3D point data is data that identifies the 3D position of a point on a surface. One example of 3D point data is the data generated by a laser scanning system as described in the Description of the Related Art section of the present application.

As further shown in FIG. 1, computer 100 also includes a central processing unit (CPU) 112 that is connected to memory 110. CPU 112 outputs the geometric data by processing the 3D point data in response to the program instructions and input from a user.

Further, computer 100 includes a memory access device 114, such as a disk drive or a networking card, which is connected to memory 110 and CPU 112. Memory access device 114 allows the program instructions and the 3D point data to be transferred to memory 110 from an external medium, such as a disk or a networked computer. In addition, device 114 allows the geometric data from memory 110 or CPU 112 to be transferred to the external medium.

In addition, computer 100 includes a display system 116 that is connected to CPU 112. Display system 116 displays images to the user which are necessary for the user to interact with the program. Computer 100 also includes a user input device 118, such as a keyboard and a pointing device, which is connected to CPU 112. Input device 118 allows the user to interact with the program.

Figure 2:
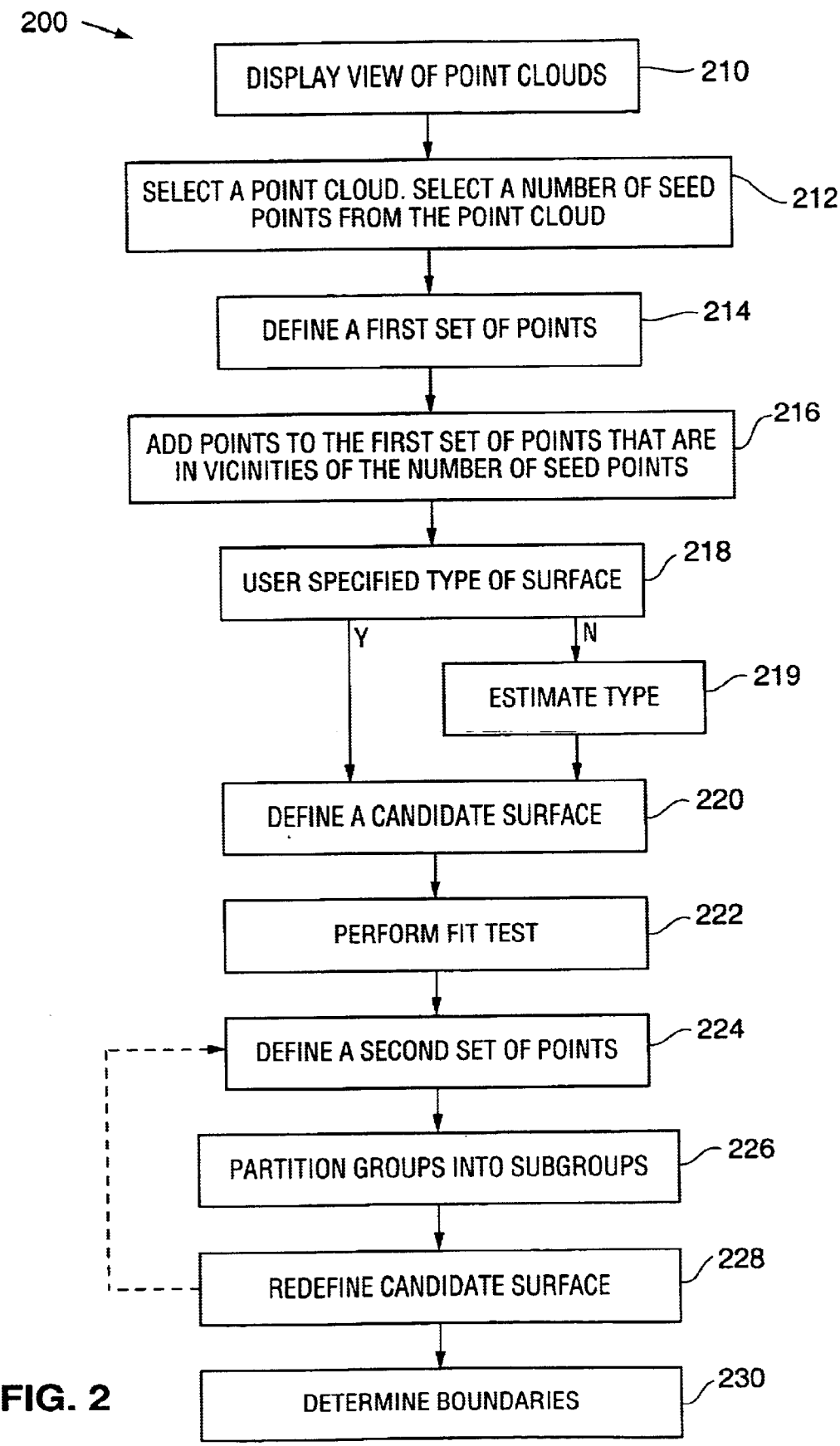
FIG. 2 is a flow chart illustrating a method 200 for identifying the points that lie on a surface of interest in accordance with the present invention.

FIG. 2 shows a flow chart that illustrates a method 200 for identifying the points that lie on a surface of interest in accordance with the present invention. As described in greater detail below, method 200 allows the points that lie on a surface of interest to be identified in response to a user selecting a single point on the surface of interest.

As shown in FIG. 2, method 200 of the present invention begins at step 210 by presenting a view of a represented structure on display 116. The view includes a number of point clouds which each include a large number of points. After the view has been presented, method 200 moves to step 212.

In step 212, a user selects a point cloud from the point clouds shown in the view. The point cloud selected is a point cloud that includes points that lie on a surface of interest. In addition, the user selects a number of seed points from the points in the selected point cloud. A seed point is a point that the user believes lies on the surface of interest. In the first embodiment of the present invention, the number of seed points selected by the user is one. Further, the user may optionally define the type of surface to fit. For example, the surface type could be specified by a geometric shape, e.g., planar, cylindrical, conical, or by a mathematical expression.

Figure 3:
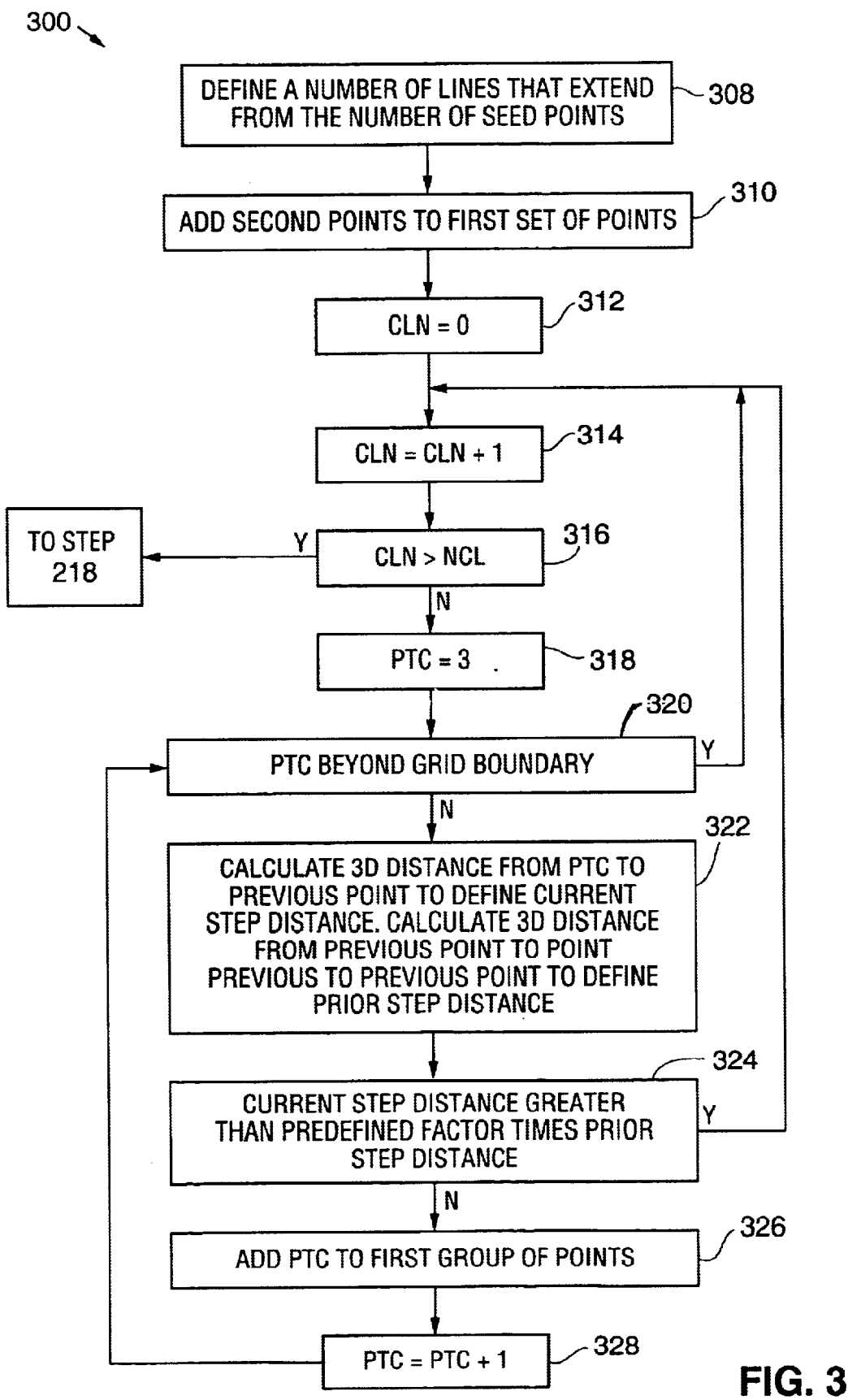
FIG. 3 is a flow chart illustrating a method 300 for performing step 214 in accordance with the present invention.

Following this, method 200 moves to step 214 to define a first set of points. The first set of points includes the number of seed points. After this, method 200 moves to step 216 to add points to the first set of points that are in vicinities of the number of seed points and likely to lie on the same surfaces as the number of seed points. FIG. 3 shows a flow chart that illustrates a method 300 for performing step 216 in accordance with the present invention.

As shown in FIG. 3, method 300 begins at step 308 by defining a number of lines that extend away from each seed point. In the first embodiment, method 300 utilizes 3D point data that is collected by a gridded-scanning system. In a gridded-scanning system, the system creates an n×m 2D grid of points by collecting m vertical scan lines of n points each.

The single user-specified seed point of the first embodiment is then defined to be the origin of a 2D coordinate system based on the grid direction, with the horizontal direction called the x axis and the vertical direction called the y axis. Each point can then be considered as either a 3D point, using the scan data, or a 2D point, using the grid data. The advantage of working with 2D data is that there are many well known image processing algorithms that can be used when the data is treated as two dimensional (even though the scan data contains the additional depth dimension as well). There are many well known mathematical representations of the notion of a neighborhood around a point in space, and any of these representations could be used here.

In the first embodiment, method 300 evaluates points along each of the lines that extend away from the seed point, which is the first point on each line, to a nearest neighbor grid point, e.g., lines extending from the seed point at the origin (0,0) through (1,0), (1,1), (0,1), (−1,1), (−1,0), (−1,−1), (0,−1), and (1,−1).

As shown in FIG. 3, after the number of lines have been defined, method 300 moves to step 310 to add the second point on each line that extends away from a seed point to the first set of points. For example, the second point (the point closest to the seed point) on the line from (0,0) to (1,0) is added to the first set, as are the second points on the lines from (0,0) to (1,1), from (0,0) to (0,1), from (0,0) to (–1,1), from (0,0) to (–1,0), from (0,0) to (–1,–1), from (0,0) to (0,–1), and from (0,0) to (1,–1).

Following this, method 300 moves to step 312 to set a current line number CLN equal to zero, and then to step 314 where the current line number CLN is incremented by one. Following this, method 300 moves to step 316 to determine if the current line number CLN is greater than the number of lines NCL defined in step 308 (eight lines in the first embodiment). If the current line number CLN is greater than the number of lines NCL, then method 300 moves to step 218 of method 200.

On the other hand, if the current line number CLN is equal to or less than the number of lines NCL, method 300 moves to step 318 where a point to check PTC is set to three. After this, method 300 moves to step 320 to determine if the point to check PTC (the third point along the current 2D-grid line) lies beyond the grid boundary. If the point to check PTC is outside the grid boundary, method 300 moves back to step 314 and increments the current line number CLN to examine the next line. If the point to check PTC lies within the grid boundaries, method 300 moves on to step 322.

In step 322, the 3D distance between the point to check PTC (the third point) and the previous point (the second point) along the current 2D-grid line is calculated to define a current step distance. In addition, the 3D distance between the previous point (the second point) and the point previous to the previous point (the seed point) is also calculated to define a prior step distance. Once these distances have been evaluated, method 300 moves on to step 324.

In step 324, the two distances from step 322 are used to check for uniformity of step spacing along the 2D-grid line. If the current step distance (between the second and third points) is more than a multiplication factor (a user-defined variable) times the previous step distance (between the seed point and the second point), then method 300 terminates the current line search and moves back to step 314 to investigate the next line. If the current step distance is equal to or less than the multiplication factor times the previous step distance, method 300 moves to step 326 where the point to check PTC (the third point) is added to the first set of points. Next, method 200 moves to step 328 to increment the point to check PTC by one.

When incremented by one, method 300 moves back to step 320 and determines if the next (the fourth) point lies beyond the grid boundary. After this, method 300 moves to step 322 to define the current step distance with the third and fourth points, and the prior step distance with the second and third points. Method 300 continues as described above until the current line number CLN exceeds the number of lines NCL in step 316.

Although step 214 has been illustrated with method 300, other equivalent methods may also be used to add points to the first set of points in step 216 that are in vicinities of the number of seed points. For example, a spatial index, such as a oct-tree, can be utilized to identify points which are close to the seed point. In addition, when scans are taken from a device that has an origin for the data, the 3D data can be projected onto a picture plane orthogonal to the view direction of the device. After this, a 2D Delaunay triangulation can be used to form a mesh over the points. The adjacency information in the resulting mesh can be used to define a candidate set of points related to the seed point.

After points have been added to the first set of points in step 216, method 200 moves to step 218 where method 200 determines if the user has specified the type of surface in step 212. If the user has defined the type of surface to fit, method 200 moves to step 220 to define a candidate surface using the first set of points and the specified surface type. The candidate surface can be defined using any of a number of prior-art fit procedures.

If the user has not specified a particular surface type, then method 200 moves to step 219 to estimate the type. For the family of quadric types (plane, cylinder, cone, sphere, etc.), a plane can be fit through the first set of points. After this, all scan points that are within a first distance (a user-defined variable) of the plane are selected to form a set of estimated points.

Once the set of estimated points has been defined, a quadric is fit to the set of estimated points. The quadric parameters are then examined to decide which type of surface the points represent. Once the surface type has been determined, method 200 moves to step 220 to fit a candidate surface of the estimated type to the first set of points. The set of estimated points is then discarded since the points were only grouped to estimate the surface type.

Once the candidate surface has been defined, method 200 moves to step 222. In step 222, a fit test is performed to ensure that the candidate surface is not distorted by the inclusion of points in the first set of points that satisfy the add criteria, but are nevertheless not on the surface of interest. The fit test is performed by first determining the distance between each of the points in the first set of points and the candidate surface in 3D space.

Next, the 3D distance of each of the points is compared to a second distance (a user-defined variable). The number of points that have a 3D distance that is equal to or less than the second distance is divided by the total number of points in the first set, and multiplied by 100 to determine a calculated percentage. The calculated percentage indicates the percentage of points in the first set that lie within the second distance of the candidate surface. The calculated percentage is then compared to the acceptance percentage (a user-defined variable).

If the calculated percentage is greater than the acceptance percentage, then points must be removed from the first set of points, and extreme points that are far from the seed are removed first. For method 300, the points on the longest line are reduced to have the same number of points as the next longest line, except that no more than ten points are discarded and at least one point is discarded.

For example, if the longest line has N points and the second longest line has M points, then the N-M points that are furthest from the seed point are removed from the longest line (with one minimum and ten maximum). After one or more points have been discarded, the candidate surface is redefined using the points in the first set of points (less the discarded points) and the user defined or estimated surface type.

Following this, the 3D distances from the remaining points in the first set of points to the redefined candidate surface are determined and compared to the second distance. The calculated percentage is then recalculated and re-compared to the acceptance percentage. This process continues until the calculated percentage is equal to or greater than the acceptance percentage. (An error message is generated if all of the points but the seed point are eliminated.)

Once the calculated percentage is greater than or equal to the acceptance percentage, the fit test in step 222 is concluded and method 200 moves to step 224. (If step 216 utilizes nongridded information, such as a spatial index, then the reduction of points in the first set, as described above, would be achieved by removing points far away from the seed point, which can be determined both from the spatial index and from the points themselves.)

At step 224, method 200 defines a second set of points. In step 224, method 200 evaluates every point in the selected point cloud to determine if the point is within a third distance (another user-defined variable) of the candidate surface. (The third distance can be conveniently set to be equal to the second distance.) Points that are within the third distance are added to the second set of points.

Typically, the second set of points includes a number of points that are from surfaces other than the surface of interest that just happen to intersect the candidate surface. For example, if the candidate surface is a plane that represents the top of a table, points from other surfaces, such as walls, that intersect the plane are frequently in the second set of points. Once each point has been evaluated, method 200 moves to step 226.

At step 226, the points in the second set of points are partitioned into a number of subgroups. that are spatially related. For example, in a gridded-scanning system, a prior-art connected-region procedure can be utilized to partition the points into a list of separate subgroups. Once the second set of points has been partitioned into subgroups, a prior-art shrinking procedure is applied to each subgroup to remove boundary points. In addition, other equivalent methods, such as spatial index grouping, can also be used to partition the second set of points into subgroups After the subgroups have been formed, method 200 moves to step 228 to again redefine the candidate surface using only the subgroups that include the number of seed points, and the user defined or estimated surface type. At this point, the method of the present invention may iterate the above steps a predetermined number of times (as specified by the user) or until some convergence criteria is satisfied. If the steps are to be iterated, the iteration begins at step 224.

Once the iterations have been completed, or if no iteration is performed, method 200 optionally moves to step 230 to determine the boundaries of the candidate surface if desired, or if appropriate for the particular surface type. For example, if the candidate surface is a plane, all of the points in the second set are projected onto the plane. Following this, a convex hull algorithm is utilized to determine a boundary on the plane. If the surface is a cylinder, all of the points in the final set are projected onto the cylinder centerline, and the two most extreme points along the centerline are accepted as the endpoints of the cylinder. If the surface is a sphere it may not be necessary to determine any additional extent information.

Thus, an apparatus and method have been described for identifying the points that lie a surface of interest by identifying only a single seed point on a surface of interest. By requiring the user to select only one seed point, a surface of interest can be easily and quickly defined with less user interaction than the manual segmentation scheme discussed previously.

In a second embodiment of the present invention, the number of seed points selected by the user in step 212 is more than one. When the user selects more than one seed point, method 300 defines a number of lines in step 308 by forming lines (in the 2D grid) that connect each seed point to every other seed point.

As a result, the number of lines attached to a seed point is one less than the number of seed points, rather than the 8 radial lines that were described in the first embodiment. For example, if three seeds points are selected, each seed point has only two lines, one line connected to each of the other seed points. For each line, Bresenham's algorithm is utilized to determine the sequence of 2D grid points along the line. Once the lines have been defined, method 300 proceeds as described previously, except that method 300 must be repeated for each of the seed points. If method 300 fails using points along the lines connecting each of the seed points, then a new set of lines is defined by using the eight lines for each seed point that would be used if that seed point were the only seed point specified by the user. If the user specified X seed points then this method would generate eight times X lines that would be investigated in method 300.

In a third embodiment of the present invention, the user must specify the surface type of the surface of interest in step 212 (as a user-defined variable) rather than having the option to specify the surface type as described above. In this case, steps 218 and 219 are eliminated and the method moves from step 216 to step 220.

When the surface type is defined, the candidate surface is defined in step 220 with the first set of points and the surface type. Further, the candidate surface is defined in step 228 with the second set of points and the surface type. Providing information on the surface type increases the accuracy of the resulting geometric model, and reduces the time required to define the surface of interest. (Alternately, method 200 can always move through step 219.)

In a fourth embodiment of the present invention, when a user selects a number of seed points and the surface type, step 216 (which adds points to the first set of points) is skipped. In this case, method 200 moves from step 214 to step 220, and defines a candidate surface using only the seed points and the user defined surface type. If the number of points is insufficient to calculate a candidate surface of the specified type then an error message is presented to the user indicating that they need to specify additional seed points.

As above, after the candidate surface has been defined, a fit test is performed at step 222. If the calculated percentage is greater than the predefined percentage, then the procedure is terminated and the user is requested to add more seed points. One of the advantages to adding points to the first set of points even when a sufficient number of seed points have been provided is that the additional points reduce the effect of point noise.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. An apparatus for identifying points on a surface of interest, the apparatus comprising:

means for selecting a number of seed points;

means for defining a first set of points, the first set of points including the number of seed points;

means for adding a number of points to the first set of points, the number of points added being in vicinities of the number of seed points and likely to lie on a same surface as the number of seed points;

means for defining a surface type;

means for defining a candidate surface with the first set of points and the surface type;

means for defining a second set of points, the second set of points including the number of seed points;

means for adding a number of points to the second set of points;

means for partitioning the second set of points into a number of spatially proximal groups of points; and means for redefining the candidate surface with the groups of points having the number of seed points, and the surface type; and wherein the means for adding a number of points to the first set of points includes;

means for defining a number of lines that extend away from the number of seed points, each seed point of the number of seed points being a first point of a line, each line having a second point and a third point;

means for adding the second point of each line to the first set of points;

for each line, means for calculating a first 3D distance from the third point to the second point, and a second 3D distance from the second point to the first point; and for each line, means for adding the third point to the first set of points when the first 3D distance is equal to or less than the second 3D distance times a multiplication factor.

2. The apparatus of 1 and further comprising means for determining if the third point is beyond a grid boundary.

3. The apparatus of claim 2 and further comprising, for each point beyond the third point, means for calculating the first 3D distance from a current point and a previous point, and the second 3D distance from the previous point and a point previous to the previous point.

4. The apparatus of claim 1 wherein the means for defining a surface type includes means for obtaining a user defined surface type.

5. The apparatus of claim 3 wherein the means for defining a surface type includes means for obtaining a user defined surface type.

6. The apparatus of claim 1 wherein the means for defining a surface type includes means for estimating a surface type.

7. The apparatus of claim 3 wherein the means for defining a surface type includes means for estimating a surface type.

8. The apparatus of claim 1 wherein the points added to the second set of points are within a predefined distance of the candidate surface.

9. The apparatus of claim 1 wherein the number of seed points is one.

10. The apparatus of claim 1 wherein the number of seed points is greater than one.

11. A method for identifying points on a surface of interest, the method comprising the steps of:

selecting a number of seed points;

defining a first set of points, the first set of points including the number of seed points;

adding a number of points to the first set of points, the number of points added being in vicinities of the number of seed points and likely to lie on a same surface as the number of seed points;

defining a surface type;

defining a candidate surface with the first set of points and the surface type;

defining a second set of points, the second set of points including the number of seed points;

adding a number of points to the second set of points;

partitioning the second set of points into a number of spatially proximal groups of points; and redefining the candidate surface with the group of points having the number of seed points, and the surface type and wherein the step for adding a number of points to the first set of points includes the steps of:

identifying a number of lines that extend away from the seed point, the seed point being a first point of each line, each line having a second point and a third point;

adding the second point of each line to the first set of points;

for each line, calculating a first 3D distance from the third point to the second point, and a second 3D distance from the second point to the first point; and for each line, adding the third point to the first set of points when the first 3D distance is equal to or less than the second 3D distance times a multiplication factor.

12. The method of claim 11 and further comprising the step of determining if the third point is beyond a grid boundary.

13. The method of claim 12 and further comprising the step of, for each point beyond the third point, calculating the first 3D distance from a current point and a previous point, and the second 3D distance from the previous point and a point previous to the previous point.

14. The method of claim 11 wherein the step of defining a surface type includes the step of obtaining a user defined surface type.

15. The method of claim 11 wherein the step of defining a surface type includes the step of estimating a surface type.

16. The method of claim 11 wherein the points added to the second set of points are within a predefined distance of the candidate surface.

17. The method of claim 11 wherein the number of seed points is one.

18. The method of claim 11 wherein the number of seed points is greater than one.

19. An apparatus for identifying points on a surface of interest from a cloud of points corresponding to a plurality of surfaces, the apparatus comprising:

input means permitting a user to select one or more seed points from the point cloud which the user believes lie on the surface of interest;

means for defining a first set of points which includes the seed points;

means for defining a selected surface type corresponding to the surface of interest;

means for defining a candidate surface using the first set of points and corresponding to the selected surface type;

means for identifying additional points from the point cloud which are in the vicinity of the candidate surface and adding those points to the first set of points to define a second set of points; and means for redefining the candidate surface using the second set of points in order to identify the points in the point cloud that correspond to the surface of interest.

20. An apparatus as recited in claim 19 further including a means for comparing the goodness of fit between the first set of points and the candidate surface and removing points from the first set that are furthest from the candidate surface.

21. An apparatus as recited in claim 19 further including a means for adding a number of points to the first set of points, the number of points added being in the vicinity of the seed points.

22. The apparatus of claim 21 wherein the means for adding a number of points to the first set of points includes:

means for defining a number of lines that extend away from the number of seed points, each seed point of the number of seed points being a first point of a line, each line having a second point and a third point;

means for adding the second point of each line to the first set of points;

for each line, means for calculating a first 3D distance from the third point to the second point, and a second 3D distance from the second point to the first point; and for each line, means for adding the third point to the first set of points when the first 3D distance is equal to or less than the second 3D distance times a multiplication factor.

23. The apparatus of claim 22 and further comprising means for determining if the third point is beyond a grid boundary.

24. The apparatus of claim 23 and further comprising, for each point beyond the third point, means for calculating the first 3D distance from a current point and a previous point, and the second 3D distance from the previous point and a point previous to the previous point.

25. The apparatus of claim 19 wherein the means for defining a selected surface type includes means for obtaining a user defined surface type.

26. The apparatus of claim 19 wherein the means for defining a selected surface type includes means for estimating a surface type.

27. A method for identifying points on a surface of interest from a cloud of points corresponding to a plurality of surfaces, the method comprising the steps of:

selecting, by the user, one or more seed points from the point cloud which appear to lie on the surface of inertest;

defining a first set of points which includes the seed points;

defining a selected surface type corresponding to the surface of interest;

defining a candidate surface using the first set of points corresponding to the selected surface type;

identifying additional points from the point cloud which are in the vicinity of the candidate surface and adding those points to the first points to define a second set of points;

partitioning the second set of points into a number of groups of points; and redefining the candidate surface using only the groups of points including the seed points in order to identify the points in the point cloud that correspond to the surface of interest.

28. A method as recited in claim 27 further the step of comparing the goodness of fit between the first set of points and the candidate surface and removing points from the first set that are furthest from the candidate surface.

29. A method as recited in claim 27 further including the step of adding a number of points to the first set of points, the number of points added being in the vicinity of the seed points.

30. A method as recited in claim 29 wherein the step for adding a number of points to the first set of points includes the steps of:

identifying a number of lines that extend away from the number of seed points, each seed point of the number of seed points being a first point of a line, each line having a second point and a third point;

adding the second point of each line to the first set of points;

for each line, calculating a first 3D distance from the third point to the second point, and a second 3D distance from the second point to the first point; and for each line, adding the third point to the first set of points when the first 3D distance is equal to or less than the second 3D distance times a multiplication factor.

31. A method as recited in claim 30 and further comprising the step of determining if the third point is beyond a grid boundary.

32. A method as recited in claim 31 further comprising the step of for each point beyond the third point, calculating the first 3D distance from a current point and a previous point, and the second 3D distance from the previous point and a point previous to the previous point.

33. A method as recited in claim 27 wherein the step of defining a selected surface type includes obtaining a user defined surface type.

34. A method as recited in claim 27 wherein the step of defining a selected surface type includes estimating a surface type.

35. A method for identifying points on a surface of interest from a cloud of points corresponding to a plurality of surfaces, the method comprising the steps of:

a) selecting the surface of interest from the plurality of surfaces;

b) selecting one or more seed points from the point cloud which appear to lie on the surface of inertest;

c) selecting a surface type corresponding to the surface of interest based on input from the user;

d) identifying a number of additional points near the seed points, with the seed points and the additional points defining a first set of points;

e) generating a candidate surface corresponding to the user selected surface type using the first set of points;

f) evaluating the candidate surface and removing points which fail to meet a predetermined criteria;

g) identifying additional points from the point cloud which are within a predetermined distance from the candidate surface and adding those points to the first points to define a second set of points;

h) partitioning the second set of points into a number of groups of points; and i) redefining the candidate surface using only some of the groups of points in order to identify points in the point cloud that correspond to the surface of interest.

36. A method as recited in claim 35 where steps (g), (h) and (i) are iteratively repeated to further refine the candidate surface to be closer to the selected surface.

* * * * *